US008601294B2

(12) United States Patent
Hsu

(10) Patent No.: US 8,601,294 B2

(45) Date of Patent: Dec. 3, 2013

(54) CONTROL APPARATUS AND UNIVERSAL REMOTE CONTROL SYSTEM USING THE SAME

(75) Inventor: Ming-Yuan Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 678 days.

(21) Appl. No.: 12/868,825

(22) Filed: Aug. 26, 2010

(65) Prior Publication Data

US 2011/0296209 A1 Dec. 1, 2011

(30) Foreign Application Priority Data

May 31, 2010 (TW) ............................... 99117482 A

(51) Int. Cl.
*G06F 1/26* (2006.01)

(52) U.S. Cl.
USPC .......................................... 713/310; 348/734

(58) Field of Classification Search
CPC ........... G08C 2201/20; G08C 2201/33; G08C 2201/42; G08C 2201/92
USPC .................................. 713/300, 310; 348/734
See application file for complete search history.

(56) References Cited

U.S. PATENT DOCUMENTS

| | | | | |
|---|---|---|---|---|
| 2004/0169590 | A1 * | 9/2004 | Haughawout et al. | 348/734 |
| 2007/0296552 | A1 * | 12/2007 | Huang et al. | 340/10.5 |
| 2008/0198273 | A1 * | 8/2008 | Yefim | 348/734 |
| 2011/0102230 | A1 * | 5/2011 | Vergis et al. | 341/176 |
| 2011/0144820 | A1 * | 6/2011 | Trauer | 341/176 |

* cited by examiner

*Primary Examiner* — Glenn A Auve

(74) *Attorney, Agent, or Firm* — Altis Law Group, Inc.

(57) ABSTRACT

A control apparatus for controlling multiple electronic devices includes a receiving unit, a relay, and a processing unit. The receiving unit receives control signals. The relay is connected between the device to be controlled and a power supply to power on/off the device to be controlled. The processing unit is connected to the receiving unit and the relay. When the processing unit receives the control signals from the receiving unit, the processing unit compares the received control signals with a reference control signal and determines whether to drive the relay to control the device according to the result of the comparison.

11 Claims, 2 Drawing Sheets

CONTROL APPARATUS AND UNIVERSAL REMOTE CONTROL SYSTEM USING THE SAME

BACKGROUND

1. Technical Field

The disclosure generally relates to control apparatuses, particularly to a control apparatus for controlling electronic devices such as home appliances and a universal remote control system using the control apparatus.

2. Description of Related Art

Devices such as televisions (TV), or air conditioners usually are configured with a corresponding infrared remote control. The device can be controlled by the infrared remote control. However, typically each device has its own dedicated remote control. Therefore, many different infrared remote controls are needed to control multiple devices, which can be inconvenient for users.

Therefore, there is room for improvement within the art.

BRIEF DESCRIPTION OF THE DRAWINGS

Many aspects of the control apparatus and universal remote control system using the same can be better understood with reference to the following drawings. The components in the drawings are not necessarily drawn to scale, the emphasis instead being placed upon clearly illustrating the principles of the control apparatus and universal remote control system using the same.

DETAILED DESCRIPTION

Figure 1:
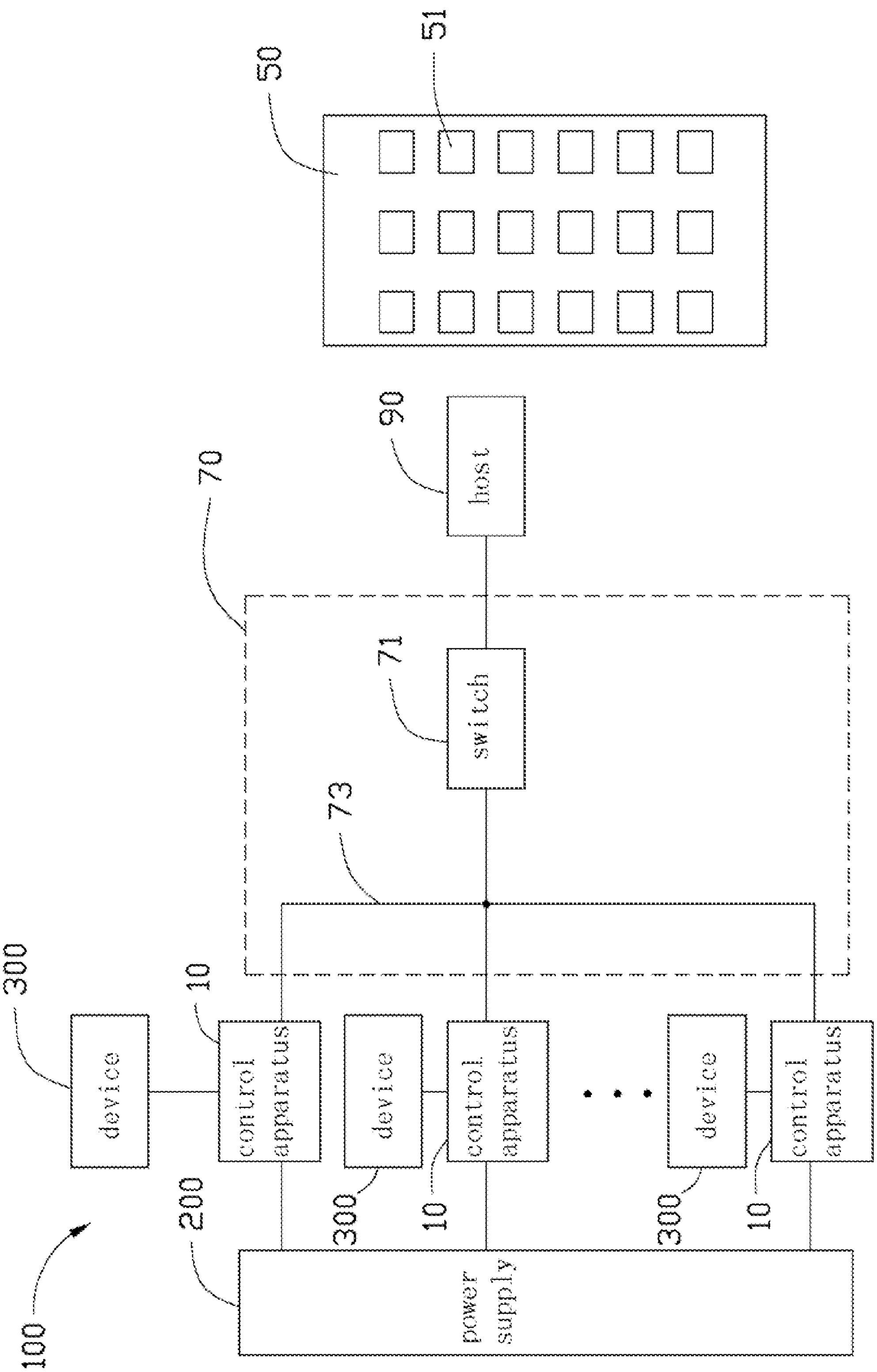
FIG. 1 is a block diagram of a universal control system employed with control apparatuses, which are for controlling devices to power on/off, according to an exemplary embodiment.

FIG. 1 shows a universal remote control system 100 for controlling multiple different electronic devices 300 such as TVs and air conditioners, according to an exemplary embodiment. The universal remote control system 100 includes a number of control apparatuses 10, a universal remote control 50, a communication network 70, and a host 90.

Each control apparatus 10 is connected between one of the devices 300 and a power supply 200. The universal remote control 50 can separately control each control apparatus 10 to remotely control each control apparatus' corresponding device 300 by emitting control signals that correspond to separately powering on/off each device 300. The host 90 is connected to the control apparatuses 10 by the communication network 70. The host 90 drives the control apparatuses 10 to control the corresponding devices 300 to power on/off each device 300 and also monitors the working states of the corresponding devices 300.

Figure 2:
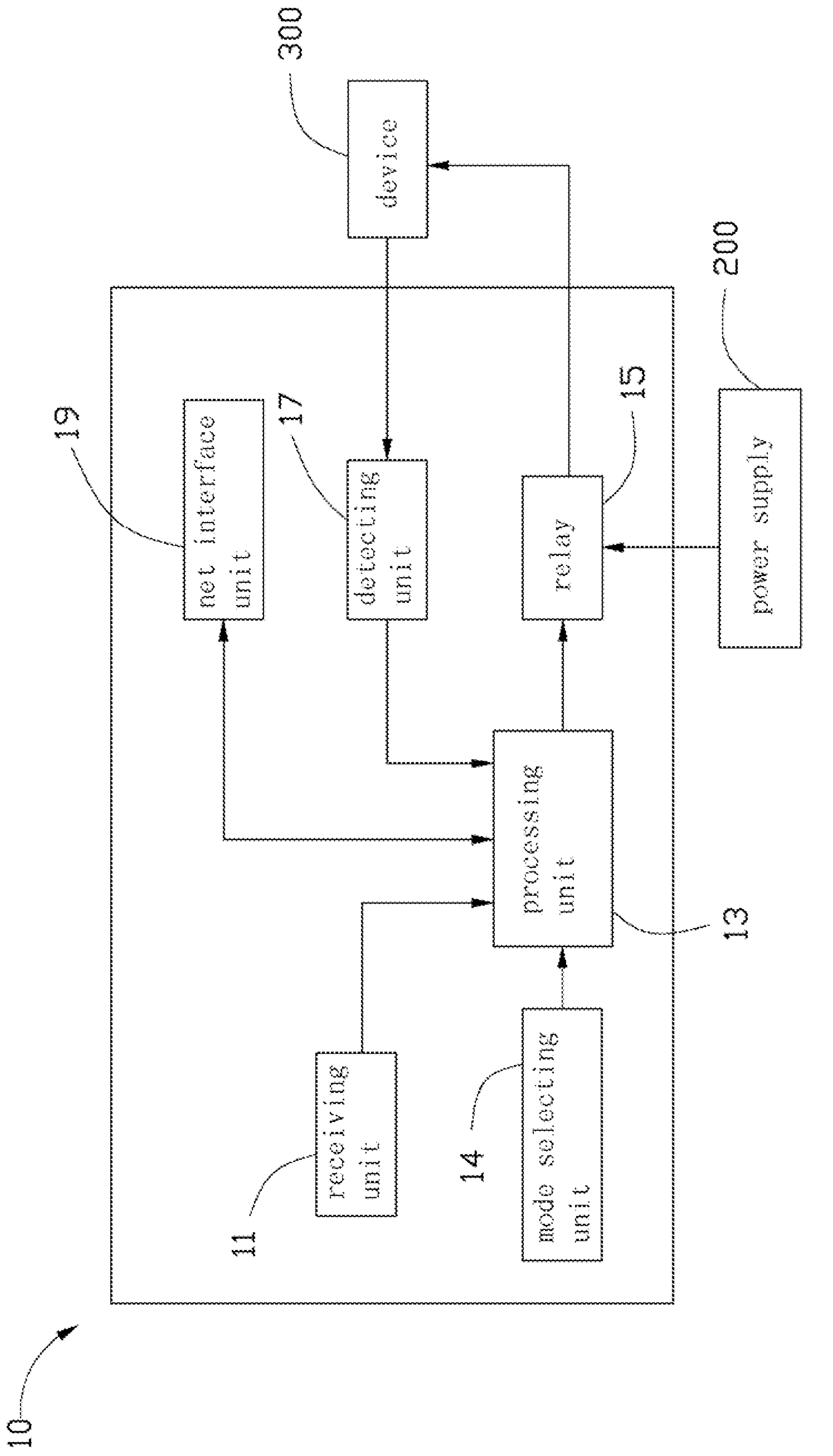
FIG. 2 is a block diagram of the control apparatus of FIG. 1.

Referring to FIG. 2, each control apparatus 10 includes a receiving unit 11, a processing unit 13, a mode selecting unit 14, a relay 15, a detecting unit 17, and a net interface unit 19. The receiving unit 11, the mode selecting unit 14, the relay 15, the detecting unit 17, and the net interface unit 19 are connected to the processing unit 13. The relay 15 is connected between the corresponding device 300 and the power supply 200. The detecting unit 17 is also connected to the corresponding device 300.

Each receiving unit 11 may be an infrared signal receiving device. The receiving unit 11 is for receiving the any of the different control signals capable of being emitted from the universal remote control 50 and sending the control signals to the processing unit 13.

The processing unit 13 includes a setting mode and a control mode. The modes of the processing unit 13 can be selected by the mode selecting unit 14. The processing unit 13 receives the control signals from the receiving unit 11. When the processing unit 13 is in the setting mode, the processing unit 13 sets which of the control signals emitted by universal remote control 50 will act as a reference control signal for powering on/off which of the corresponding devices 300. When the processing unit 13 is in the control mode, each processing unit 13 compares the control signal received from the universal remote 50 with the preset reference control signal. If the received control signal in the control mode matches the preset reference control signal, the processing unit 13 drives the relay 15 to control the corresponding device 30 to power on/off.

When the relay 15 is turned on, the power supply 200 provides electrical power to the corresponding device 300. When the relay 15 is turned off, the power supply 200 stops providing electrical power to the corresponding device 300.

The detecting unit 17 detects working states such as working voltage and current of the device 300 and sends the information of the working states to the processing unit 13.

The net interface unit 19 connects to the communication network 70. The processing unit 13 sends the information of the working states of the devices 300 to the host 90 by the net interface unit 19 and the communication network 70.

The remote control 50 may be an infrared signal emitting device. The remote control 50 includes a number of keys 51 that correspond to the number of control apparatuses 10 provided with the universal remote control system 100. As previously mentioned, each electronic device 300 corresponds to one control apparatus 10. Therefore, each key 51 corresponds to one of the devices 300. Each key 51 of the remote control 50 causes the remote control 50 to emit a control signal of a different wavelength. Each wavelength control signal corresponds to one of the devices 300 and can be transmitted to the control apparatus 10 connected to the device 300 as the preset reference control signal in the set mode or as the received control signal in the control mode.

The communication network 70 may be conventional internet or local area network (LAN) including a switch 71 and a number of transmitting lines 73 connecting between the switch 71 and each control apparatus 10.

The host 90 can drive the control apparatuses 10 to control each device 300 and monitor the working states of each device 300 by the communication network 70.

In use, first, each processing unit 13 is separately placed into the set mode. One of the keys 51 is pressed to emit a control signal of some wavelength. The receiving unit 11 sends the received control signal to the processing unit 13. The processing unit 13 sets the received control signal as a reference control signal for the corresponding device 300. This process is repeated for each processing unit 13 with a different control system wavelength corresponding to a different key 51. Therefore, each control apparatus 10 sets the reference control signal for the device 300 connected thereto.

Then, the processing units 13 are placed into the control mode. When a key 51 of the remote control 50 is pressed, the remote control emits a control signal associated with that key 51. All receiving units 11 receive the control signal and send the control signal to the processing unit 13. The processing units 13 compares the received control signal with the preset reference control signal of each processing unit 13. If the received control signal matches with the preset reference control signal for a specific processing unit 13, the processing unit 13 controls the corresponding device 300 to power on/off. Therefore, the control apparatuses 10 can be used to conveniently control their corresponding devices 300 with the single remote control 50.

In addition, the detecting unit 17 detects the workings states of each device 300 and sends the information of the working states to the processing units 13. The processing unit 13 sends the information of the working states to the host 90 through the net interface unit 19 and the communication network 70. Therefore, the host 90 monitors the working states of each device 300. In addition, the host 90 can be operated to control the infrared remote control apparatus 10 to power on/off each device 300 with the communication network 70.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A control apparatus for controlling a device; comprising:

a receiving unit receiving control signals;

a relay connected between the device and a power supply to power on/off the device; and a processing unit connecting the receiving unit and the relay; wherein when the processing unit receives the control signals from the receiving unit, the processing unit compares the received control signals with a preset reference control signal and determines whether to drive the relay to control the device according to the comparison;

the processing unit includes a set mode and a control mode, when in the set mode, the processing unit sets one of the received control signals as the reference control signal, and in the control mode, the processing unit drives the relay to power on/off the device.

2. The control apparatus as claimed in claim 1, further comprising a mode selecting unit connected to the processing unit to place the processing unit into the set mode or the control mode.

3. The control apparatus as claimed in claim 1, further comprising a detecting unit connected between the processing unit and the device, wherein the detecting unit detects working states of the device and sends information of the working states to the processing unit.

4. The control apparatus as claimed in claim 1, further comprising a net interface unit connected to the processing unit.

5. A universal remote control system for controlling multiple devices; comprising:

a universal remote control apparatus emitting control signals corresponding to each device; and a plurality of control apparatuses; each control apparatus, comprising:

a receiving unit receiving the control signals from the remote control apparatus;

a relay connected between one of the devices and a power supply to separately power on/off each device; and a processing unit connected to the receiving unit and the relay; wherein when the processing unit receives the control signals from the receiving unit; and the processing unit compares the received control signals with a preset reference control signal and determines whether to drive the relay to control the one of the devices connected to the relay according to the comparison;

the processing unit includes a set mode and a control mode, when in the set mode, the processing unit sets one of the received control signals as the reference control signal, and in the control mode, the processing unit drives the relay to control the one of the devices connected to the relay.

6. The universal remote control system as claimed in claim 5, therein the remote control apparatus further includes a plurality of keys, each key can be pressed to emit the control signal of a different wavelength for one of the corresponding electronic devices.

7. The universal remote control system as claimed in claim 5, further comprising a mode selecting unit connected to the processing unit to place the processing unit into the set mode or the control mode.

8. The universal remote control system as claimed in claim 5, further comprising a detecting unit connected between the processing unit and the one of the devices connected to the relay, the detecting unit detects working states of the one of the devices and sends information of the working states to the processing unit.

9. The universal remote control system as claimed in claim 8, further comprising a host and a communication network, wherein the host is connected to the control apparatuses by the communication network and receives the information of the working states of each device from the control apparatuses.

10. The universal remote control system as claimed in claim 9, wherein the host controls the control apparatuses to power on/off each device by the communication network.

11. The universal remote control system as claimed in claim 9, further comprising a net interface unit connected between the processing unit and the communication network.

* * * * *